United States Patent [19]

Post

[11] Patent Number: 5,033,153

[45] Date of Patent: Jul. 23, 1991

[54] SIMULTANEOUS PIPE CUTTER-SIZER

[76] Inventor: Terrance L. Post, Rte. 4, Box 316D, Bentonville, Ak. 72712

[21] Appl. No.: 529,195

[22] Filed: May 25, 1990

[51] Int. Cl.⁵ .............................................. D26B 13/26
[52] U.S. Cl. ...................................................... 30/102
[58] Field of Search .................. 30/95, 101, 102, 90.3, 30/418, 426, 422, 427, 307

[56] References Cited

U.S. PATENT DOCUMENTS

| | | | |
|---|---|---|---|
| 2,410,901 | 11/1946 | Ramsey | 30/102 |
| 4,080,733 | 3/1978 | Clegg | 30/102 |
| 4,847,997 | 7/1989 | Petty | 30/95 |
| 4,858,316 | 8/1989 | Dubey | 30/102 |

Primary Examiner—Douglas D. Watts
Attorney, Agent, or Firm—Head & Johnson

[57] ABSTRACT

In accordance with the invention, a tool for simultaneously cutting and sizing one of a class of pipe or tubing of selected various inner and outer diameters consists of two intersecting members pivotally connected for relative rotation about the axis of their intersection. The members have at least one pair of mirrored recesses which rotate into and out of face-to-face abutment in a plane passing through the axis of intersection. One such pair of mirrored recesses is provided for each selected outer diameter of pipe or tubing to be cut and sized by the tool. Each pair of mirrored recesses conforms to a cylindrical coutour of diameter substantially equal to its corresponding pipe or tubing outer diameter. At least two cutting wheels are associated with each recess. Each of the wheels are pinned for rotation within either of the members about their own axes which are parallel to the axis of intersection of the members. A portion of each wheel penetrates into its respective recess along at least one half the perimeter thereof and to a depth greater than the thickness of its corresponding pipe or tubing. The wheels of the recesses have their cutting edges disposed in a single plane transverse to the axis of intersection of the members.

21 Claims, 3 Drawing Sheets

SIMULTANEOUS PIPE CUTTER-SIZER

BACKGROUND OF THE INVENTION

This invention relates generally to hand tools and more particularly concerns tools for cutting pipe and tubing and the like such as is used in plumbing and building construction Cutting various diameter pipes and tubes to necessary lengths is a common in-field occurrence in many building and other engineering trades. Generally, the cutting process results in a deformation of the circular cross section of the pipe or tubing at the circumference of the cut, making proper fittings and connections difficult, if not impossible. As a result, an additional sizing step to restore the tubing or pipe to its circular configuration is also required. Often this added step further involves the use of additional tools.

Many tools have been devised to expedite these tasks. Some such devices have employed complex mechanisms to control the pressure applied to the pipe or tubing so as to prevent deformation during the cutting process. Such tools require tension adjustments during the cutting process to gradually increase the force exerted at the cutting surface. More recently, my improved tubing cutters described in U.S. Pat. No. 4,847,997, provide cutting and sizing fitting in a single tool, but even this tool requires two separate steps to accomplish these tasks.

It is, therefore, an object of the present invention to provide a tool with which pipe and tubing may be cut and sized in a single operation.

It is a further object of this invention to provide a tool which is easily manipulable with one hand.

It is also an object of this invention to provide a useful tool for simultaneous cutting and sizing of more than one size of pipe.

Another object of this invention is to provide a tool which is simply and sturdily constructed.

SUMMARY OF THE INVENTION

In accordance with the invention, a tool for simultaneously cutting and sizing one of a class of pipe or tubing of selected various inner and outer diameters consists of two intersecting members pivotally connected for relative rotation about the axis of their intersection. The members have at least one pair of mirrored recesses which rotate into and out of face-to-face abutment in a plane passing through the axis of intersection. One such pair of mirrored recesses is provided for each selected outer diameter of pipe or tubing to be cut and sized by the tool. Each pair of mirrored recesses conforms to a cylindrical contour of diameter substantially equal to its corresponding pipe or tubing outer diameter. At least two cutting wheels are associated with each recess. Each of the wheels are pinned for rotation within either of the members about their own axes which are parallel to the axis of intersection of the members. A portion of each wheel penetrates into its respective recess along at least one half the perimeter thereof and to a depth greater than the thickness of its corresponding pipe or tubing. The wheels of the recesses have their cutting edges disposed in a single plane transverse to the axis of intersection of the members.

In a preferred embodiment, at least one of the sets of mirrored recesses has a central portion conforming to a first cylindrical configuration and end portions conforming to a second cylindrical configuration of greater diameter than the first.

In a preferred embodiment employing multiple sets of mirrored recesses, each pair of cutting wheels may be used in conjunction with two sets of recesses.

BRIEF DESCRIPTION OF THE DRAWINGS

Other objects and advantages of the invention will become apparent upon reading the following detailed description and upon reference to the drawings in which.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION OF THE INVENTION

Figures 1, 4:
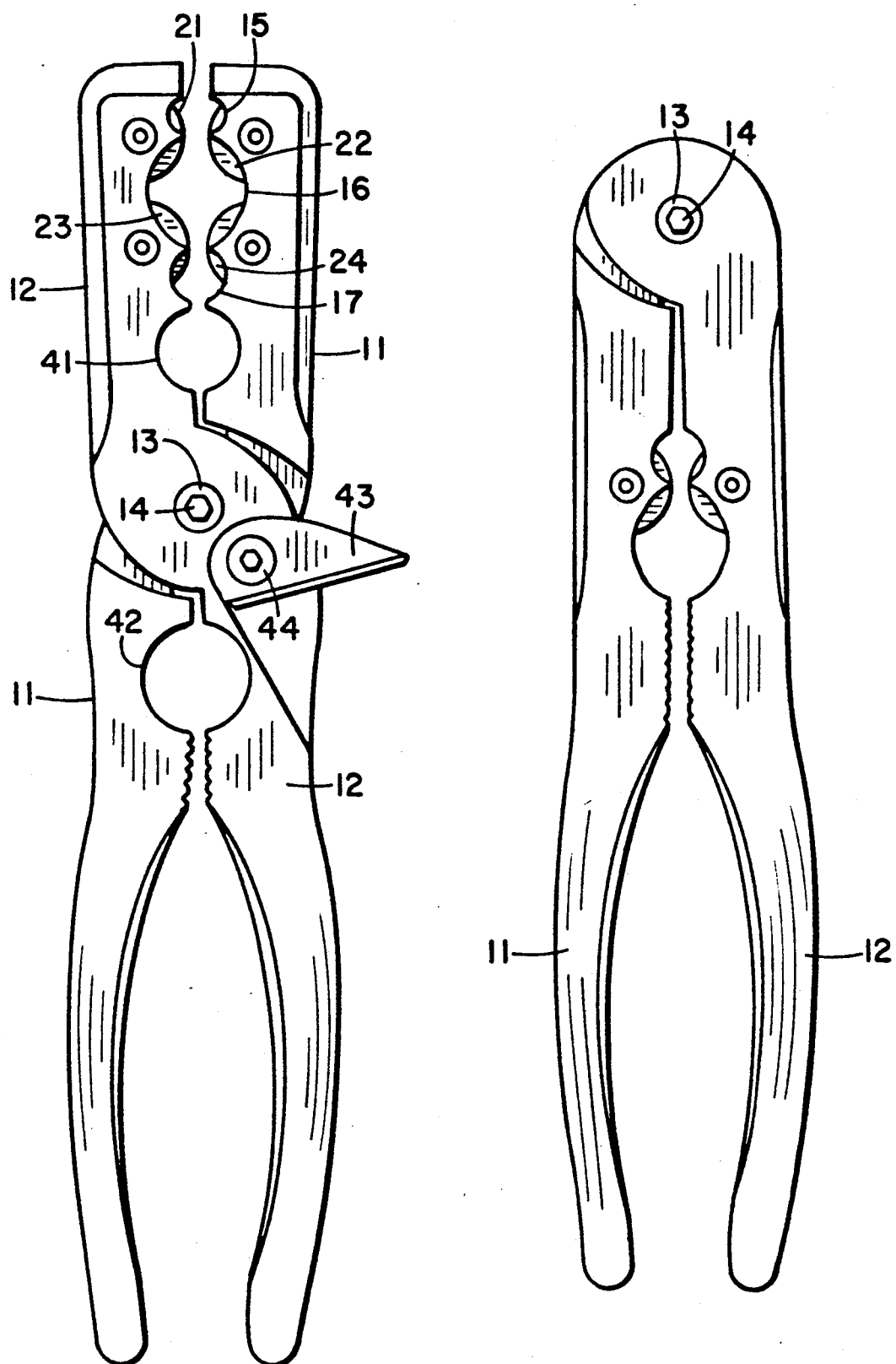
FIG. 1 is a full face view of one embodiment of the simultaneous cutter-sizer.
FIG. 4 is a full face view of another embodiment of the simultaneous pipe cutter-sizer.

FIG. 1 illustrates one embodiment of the simultaneous pipe cutter sizer. The tool consists of a pair of members 11 and 12 which are pivotally connected at a precision pivot point 13 for rotation about their axis of intersection 14. As shown, the members have pairs of mirrored recesses, the number of pairs of mirrored recesses being the same or less than the number of different pipe sizes to be cut and sized by the tool. As shown, the tool includes an upper pair of recesses 15, an intermediate pair of recesses 16 and a lower pair of recesses 17. It should be kept in mind that the tool may incorporate any number of pairs of recesses either above or below the axis of intersection 14 and without regard to any systematic sequence of size.

As shown, the upper 15 and lower 17 pairs of recesses are cylindrically contoured when the tool is in the closed condition. The diameter of each pair of recesses is substantially equal to the outer diameter of the pipe or tubing that is intended to be cut and sized in that recess.

Figure 2:
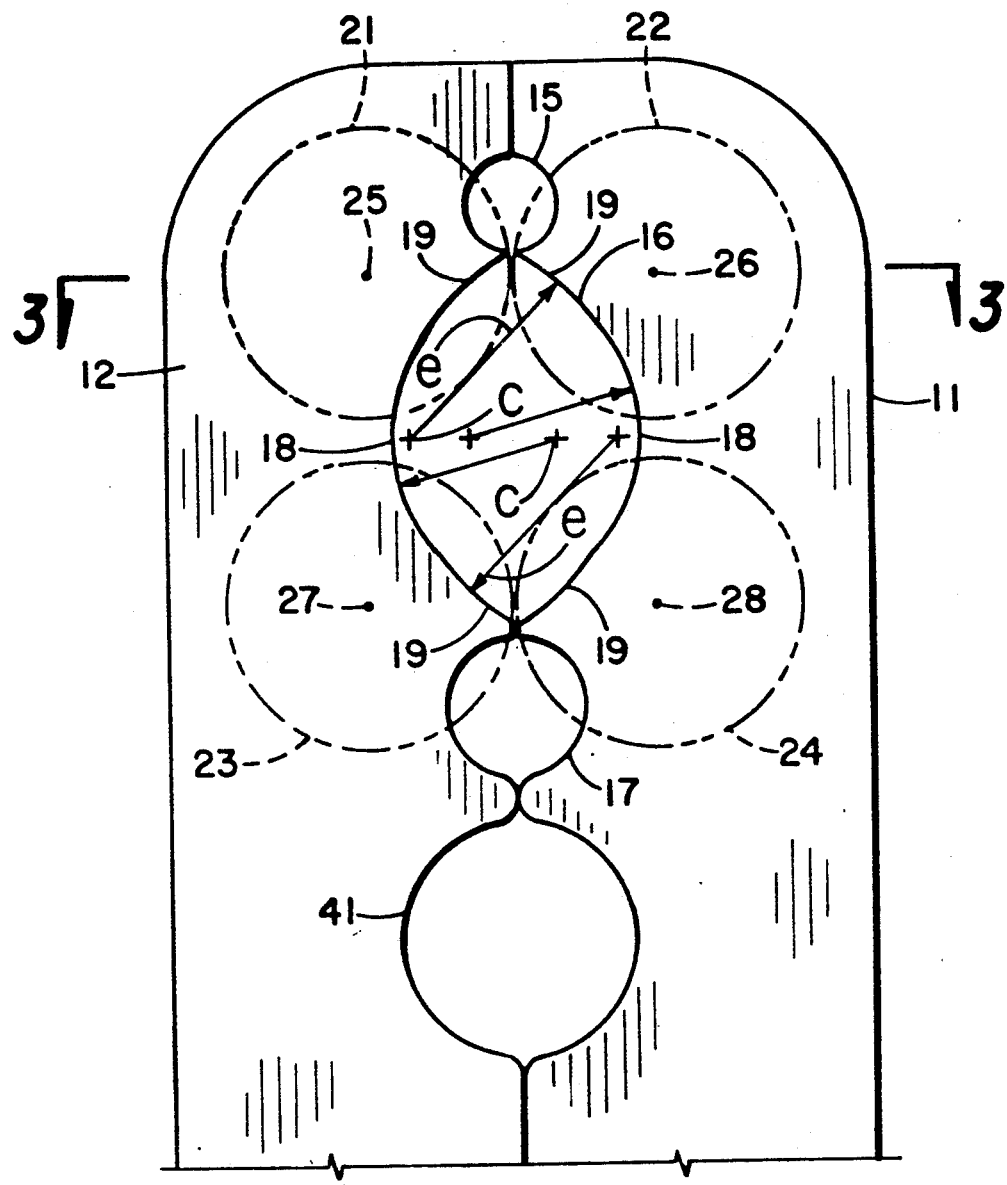
FIG. 2 is a partial exploded face view of the embodiment of FIG. 1.

As can best be seen in FIG. 2, the intermediate recess 16 defines two cylindrical contours, a central cylindrical contour 18 and an end cylindrical contour 19. The diameter of the end contour 19 is larger than the diameter of the central contour 18. The central contour 18 assumes its cylindrical relationship at a first open position of the tool when the origin of its radii "c" coincide with the end contour 19 assumes its cylindrical relationship at a second open position of the tool when the origin of its radii "e" coincide.

Figure 3:
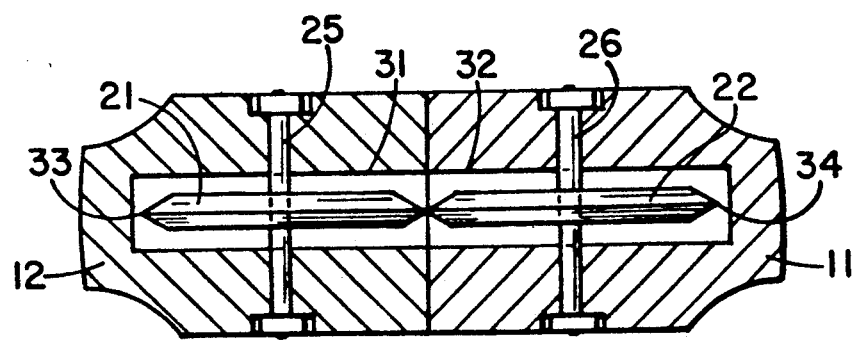
FIG. 3 is a cross section view taken along the line 3—3 of FIG. 2.

At least two cutting wheels are associated with each of the pairs of recesses. As shown in FIGS. 1 and 2, the upper recesses 15 employ two cutting wheels 21 and 22 mounted on the members 11 and 12. The intermediate cylindrical recesses 16 employ the same two cutting wheels 21 and 22 and also two additional cutting wheels 23 and 24. The lower cylindrical recesses 17 also employ the latter two cutting wheels 23 and 24 also disposed in the members 12 and 11. Each of the cutting wheels is pinned for rotation about a pin 25, 26, 27 or 28 and within a slot 31 or 32 provided in its member 11 or 12 as shown in FIG. 3. Each cutting wheel 21, 22, and 24 is mounted for rotation about its own pin 25, 26, 27 and 28 which has an axis parallel to the pivotal axis 14 of the intersecting members 11 and 12. The location of the pins and the diameter of the cutting wheels are coordinated so that each cutting wheel penetrates sufficiently into its respective recesses so as to have a depth greater than the thickness of the pipe or tubing it is intended to cut. In addition, the cutting wheels penetrate at least one half the perimeter of their recesses. As can best be seen in FIG. 3, the cutting wheels 21, 22, 23 and 24 have their cutting edges 33, 34, 35 and 36 disposed in a single plane which is transverse to pivotal axis 14 of the intersecting members 11 and 12. While this is preferred, it is not necessary to that the cutting edges of wheels associated with different recesses be in the same plane.

As shown in FIG. 3, corners of the recesses may be curved to eliminate sharp or angular edges where the surfaces of the recesses meet the surfaces of the member at the abutting plane.

As shown the pipe cutter-sizer may, but need not necessarily, include one or more sizing holes 41 or 42 which can be located on either side or both sides f the intersection axis 14. These sizing holes 41 and 42 are also cylindrically contoured when the tool is closed.

In a particularly preferred embodiment, the upper recesses 15 will conform to a ¼" O.D. pipe, the intermediate recesses 16 to a ⅞" O.D. at the central portion 18 and to a 1⅛" O.D. at the end portions 19 and the lower recesses 17 to a ⅝" O.D. while the upper 41 and lower 42 sizing holes conform to ⅜" and ⅞" OD's respectively.

It makes no difference whether the pairs of recesses are above or below the axis of intersection 14 of the members 11 and 12, as is illustrated in reference to the two hole tool of FIG. 4.

In addition, the tool may also employ a recess 43 rotatively attached to one of the members by a pin 44, as shown in FIG. 1.

Figure 5:
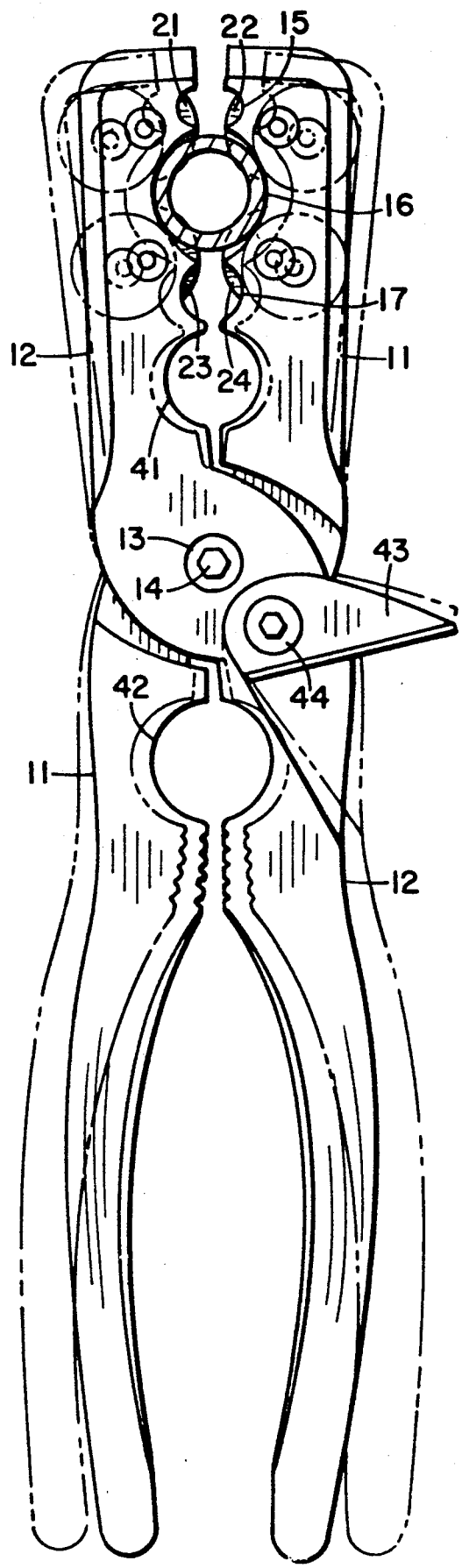
FIG. 5 is a full face view illustrating the operation of the pipe cutter-sizer on a section of pipe.

Turning to FIG. 5, the operation of the simultaneous pipe cutter sizer can be easily understood. With the tool in the open condition illustrated in phantom, the pipe or tubing can be inserted into the sizing hole which corresponds to its outer diameter. As pressure is applied to close the tool and the tool is rotatively reciprocated back and forth, also shown in phantom, the cutting wheels penetrate and cut the pipe, until the pipe is fully cut and the outer surface of the pipe coincides with the diameter of the cylindrical recesses. Since the entire circumference of the pipe comes in contact with the surface of the cylindrical recess during the rotation process, the reciprocal motion of the tool conforms the pipe to the desired cylindrical configuration. The degree of reciprocal rotation need only be slightly greater than the maximum angular distance between the cutting wheels employed.

The tool may be constructed of any suitable metal or plastic material or combination thereof and nickel chrome plated cast aluminum has been found to provide an excellent hard surfaced, lightweight tool.

Thus it is apparent that there has been provided, in accordance with the invention, the simultaneous pipe cutter sizer that fully satisfies the objects, aims and advantages set forth above. While the invention has been described in conjunction with specific embodiments thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. A tool for simultaneously cutting and sizing one of a class of pipes or tubing of selected various inner and outer diameters comprising:

two members pivotally connected at an axis of intersection thereof, said members having at least two pair of mirrored recesses thereon, one pair for each selected outer diameter of pipe or tubing to be cut and sized, each said pair of recesses being aligned for rotation about said pivotal axis into and out of face-to-face relationship in a plane passing through said pivotal axis, each said pair of mirrored recesses conforming to a cylindrical configuration of diameter substantially equal to the outer diameter of the pipe or tubing selected therefor when said mirrored pairs are in face-to-face relationship; and at least two cutting wheels penetrating each pair of mirrored recesses to a depth greater than the thickness of the pipe or tubing selected therefor, each of said cutting wheels being pinned for rotation within one of said members about its own axis parallel to said pivotal axis, said cutting wheels of each said pair of recesses having cutting edges disposed in a single plane transverse to said pivotal axis two pairs of said at least two pairs of mirrored recesses having two of said cutting wheels in common.

2. A tool according to claim 1, said member having upper intermediate and lower mirrored recesses thereon, said upper and intermediate mirrored recesses having a first pair of cutting wheels in common and said lower and intermediate mirrored recesses having a second pair of cutting wheels in common.

3. A tool according to claim 2, said upper, intermediate and lower mirrored recesses being disposed above said axis of intersection.

4. A tool according to claim 3 further comprising a fourth pair of cylindrically contoured mirrored recesses disposed between said lower mirrored recesses and said axis of intersection.

5. A tool according to claim 3 further comprising a fourth pair of cylindrically contoured mirrored recesses disposed opposite said axis of intersection from said lower mirrored recesses.

6. A tool according to claim 4 further comprising a fifth pair of cylindrically contoured mirrored recesses disposed opposite said axis of intersection from said fourth pair of mirrored recesses.

7. A tool according to claim 6 further comprising a reamer pivotally mounted on one of said members proximate its mid point.

8. A tool for simultaneously cutting and sizing one of a class of pipes or tubing of selected various inner and outer diameters comprising:

two members pivotally connected at an axis of intersection thereof, said members having at least one pair of mirrored recesses thereon, one pair for each selected outer diameter of pipe or tubing to be cut and sized, each said pair of recesses being aligned for rotation about said pivotal axis into and out of face-to-face relationship in a plane passing through said pivotal axis, each said pair of mirrored recesses conforming to a cylindrical configuration of diameter substantially equal to the outer diameter of the pipe or tubing selected therefor when said mirrored pairs are in face-to-face relationship;

at least one of said pairs of mirrored recesses having a central portion conforming to a first cylindrical configuration when said members are in a first speed relationship and end portions conforming to a second cylindrical configuration of greater diameter than said first cylindrical configuration when said members are in a second spaced relationship; and at least two cutting wheels penetrating each pair of mirrored recesses to a depth greater than the thickness of the pipe or tubing selected therefor, each of said cutting wheels being pinned for rotation within one of said members about its own axis parallel to said pivotal axis, said cutting wheels of each said pair of recesses having cutting edges disposed in a single plane transverse to said pivotal axis.

9. A tool according to claim 8, said members having at least two pairs of mirrored recesses thereon, said two pairs of mirrored recesses having two of said cutting wheels in common.

10. A tool according to claim 8, said member having upper, intermediate and lower mirrored recesses thereon, said upper and intermediate mirrored recesses having a first pair of cutting wheels in common and said lower and intermediate mirrored recesses having a second pair of cutting wheels in common, said at least one of said pairs of mirrored recesses having middle and end portions conforming to first and second cylindrical configurations being said intermediate pair of mirrored recesses.

11. A tool according to claim 10, said upper, intermediate and lower mirrored recesses being disposed above said axis of intersection.

12. A tool according to claim 11 further comprising a fourth pair of cylindrically contoured mirrored recesses disposed between said lower mirrored recess and said axis of intersection.

13. A tool according to claim 11, further comprising a fourth pair of cylindrically contoured mirrored recesses disposed opposite said axis of intersection from said lower mirrored recesses.

14. A tool according to claim 12 further comprising a fifth pair of cylindrically contoured mirrored recesses disposed opposite said axis of intersection from said fourth pair of mirrored recesses.

15. A tool according to claim 14 further comprising a reamer pivotally mounted on one of said members proximate its mid point.

16. A tool for simultaneously cutting and sizing one of a class of pipes or tubing of selected various inner and outer diameters comprising:

two members pivotally connected at an axis of intersection thereof;

an upper pair of mirrored recesses aligned within said members for rotation about said pivotal axis into and out of face-to-face relationship in a plane passing through said pivotal axis and conforming in a closed position to a first cylindrical configuration of diameter substantially equal to the outer diameter of a first selected pipe or tubing;

an intermediate pair of mirrored recesses aligned within said member for rotation about said pivotal axis into and out of face-to-face relationship in said plane, said intermediate pair of recesses having a middle portion conforming in a first open position to a second cylindrical configuration of diameter substantially equal to the outer diameter of a second selected pipe or tubing and end portions conforming in a second open position to a third cylindrical configuration of diameter substantially equal to the outer diameter of a third selected pipe or tubing;

a lower pair of mirrored recesses aligned within said members for rotation about said pivotal axis into and out of face-to-face relationship in a plane passing through said pivotal axis and conforming in a closed position to a fourth cylindrical configuration of diameter substantially equal to the outer diameter of a fourth selected pipe or tubing;

a first pair of cutting wheels, each penetrating said upper and intermediate pairs of mirrored recesses to a depth greater than the thickness of the pipe or tubing selected therefor; and a second pair of cutting wheels each penetrating said lower and intermediate pairs of mirrored recesses to a depth greater than the thickness of the pipe or tubing selected therefor;

each of said first and second pairs of cutting wheels being pinned for rotation within one of said members about its own axis parallel to said pivotal axis, all of said cutting wheels having cutting edges disposed in a single plane transverse to said pivotal axis.

17. A tool according to claim 16 further comprising a fourth pair of mirrored recesses conforming in a closed position to a fifth cylindrical configuration disposed between said lower pair of mirrored recesses and said axis of intersection.

18. A tool according to claim 16 further comprising a fourth pair of mirrored recesses conforming in a closed position to a fifth cylindrical configuration disposed opposite said axis of intersection from said lower pair of mirrored recesses.

19. A tool according to claim 17 further comprising a fifth pair of mirrored recesses conforming in a closed position to a sixth cylindrical configuration disposed opposite said axis of intersection from said fourth pair of mirrored recesses.

20. A tool according to claim 16:

the diameter of said first cylindrical configuration being $\frac{1}{4}''$;

the diameter of said second cylindrical configuration being $1\frac{7}{8}''$;

the diameter of said third cylindrical configuration being $1\frac{1}{8}''$; and the diameter of said fourth cylindrical configuration being in the range of $\frac{3}{8}''$ to $\frac{1}{2}''$.

21. A tool according to claim 19:

the diameter of said first cylindrical configuration being $\frac{1}{4}''$;

the diameter of said second cylindrical configuration being $\frac{7}{8}''$;

the diameter of said third cylindrical configuration being $1\frac{1}{8}''$;

the diameter of said fourth cylindrical configuration being in the range of $\frac{3}{8}''$ to $\frac{1}{2}''$;

the diameter of said fifth cylindrical configuration being $\frac{5}{8}''$; and the diameter of said sixth cylindrical configuration being $\frac{7}{8}''$.

* * * * *

UNITED STATES PATENT AND TRADEMARK OFFICE
CERTIFICATE OF CORRECTION

PATENT NO. : 5,033,153
DATED : July 23, 1991
INVENTOR(S) : TERRANCE L. POST

It is certified that error appears in the above—identified patent and that said Letters Patent is hereby corrected as shown below:

Item [76]: Cover page, column 1, line 3, change "Ak." to --Ark.--

Signed and Sealed this

First Day of December, 1992

Attest:

DOUGLAS B. COMER

*Attesting Officer*   Acting Commissioner of Patents and Trademarks